(12) United States Patent
Newton (10) Patent No.: US 10,257,911 B2
(45) Date of Patent: Apr. 9, 2019

(54) METHODS AND APPARATUS FOR LIGHTING UNIT CONFIGURE FOR PRESENCE DETECTION

(71) Applicant: SIGNIFY HOLDING B.V., Eindhoven (NL)

(72) Inventor: Philip Steven Newton, Waalre (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 3 days.

(21) Appl. No.: 15/346,149

(22) Filed: Nov. 8, 2016

(65) Prior Publication Data

US 2017/0055330 A1 Feb. 23, 2017

Related U.S. Application Data

(62) Division of application No. 14/417,191, filed as application No. PCT/IB2013/055843 on Jul. 16, 2013, now Pat. No. 9,510,429.

(60) Provisional application No. 61/676,359, filed on Jul. 27, 2012.

(51) Int. Cl.
*H05B 37/02* (2006.01)
*H05B 33/08* (2006.01)
*G01S 13/04* (2006.01)

(52) U.S. Cl.
CPC .......... *H05B 37/0227* (2013.01); *G01S 13/04* (2013.01); *H05B 33/0824* (2013.01); *H05B 33/0854* (2013.01); *H05B 37/0272* (2013.01)

(58) Field of Classification Search
CPC ............ H05B 33/0815; H05B 33/0818; H05B 37/029; H05B 41/3925; H05B 41/2828; H05B 33/0803; H05B 37/0227; H05B 33/0854; G01S 13/04; F21V 23/001; F21V 23/003
See application file for complete search history.

(56) References Cited

U.S. PATENT DOCUMENTS

| | | | | |
|---|---|---|---|---|
| 2009/0091932 A1* | 4/2009 | Weekamp | ............... | B21F 45/00 362/249.02 |
| 2012/0086345 A1* | 4/2012 | Tran | ................... | H05B 37/0272 315/158 |
| 2013/0141018 A1* | 6/2013 | Kamii | ................ | H05B 33/0863 315/360 |
| 2017/0273162 A1* | 9/2017 | Tran | ................... | H05B 33/0845 |

FOREIGN PATENT DOCUMENTS

| | | |
|---|---|---|
| CN | 201851959 U | 6/2011 |
| CN | 202172731 U | 3/2012 |
| JP | 2010219846 A | 9/2010 |

(Continued)

*Primary Examiner* — Seokjin Kim
(74) *Attorney, Agent, or Firm* — Meenakshy Chakravorty (57) ABSTRACT

Methods and apparatus related to a LED-based lighting unit (10; 110; 210; 310; 410) having a radar for presence detection. A radar circuit (140; 240; 340A; 340B; 440) may be electrically coupled to conductive wiring (25; 125; 225; 325; 425) of the LED-based lighting unit that at least selectively powers the radar circuit and at least selectively powers the LEDs. In some implementations, an antenna coupled to the radar circuit may be formed from the conductive wiring and optionally at least partially isolated from any current flowing through the LEDs.

3 Claims, 5 Drawing Sheets

(56) References Cited

FOREIGN PATENT DOCUMENTS

| JP | 2011009083 A | 1/2011 |
| JP | 2011034760 A | 2/2011 |
| JP | 2011044400 A | 3/2011 |
| JP | 2011155471 A | 8/2011 |
| JP | 2012078169 A | 4/2012 |
| JP | 2012142181 A | 7/2012 |

* cited by examiner

METHODS AND APPARATUS FOR LIGHTING UNIT CONFIGURE FOR PRESENCE DETECTION

CROSS-REFERENCE TO PRIOR APPLICATIONS

This application is a divisional of U.S. patent application Ser. No. 14/417,191, filed on Jan. 26, 2015, which is a U.S. National Phase Application under 35 U.S.C. § 371 of International Application No. PCT/IB2013/055843, filed on Jul. 16, 2013, which claims the benefit of U.S. Provisional Patent Application No. 61/676,359, filed on Jul. 27, 2012. These applications are hereby incorporated by reference herein.

TECHNICAL FIELD

The present invention is directed generally to a lighting unit configured for presence detection. More particularly, various inventive methods and apparatus disclosed herein relate to an LED-based lighting unit employing a radar device for presence detection.

BACKGROUND

Digital lighting technologies, i.e. illumination based on semiconductor light sources, such as light-emitting diodes (LEDs), offer a viable alternative to traditional fluorescent, HID, and incandescent lamps. Functional advantages and benefits of LEDs include high energy conversion and optical efficiency, durability, lower operating costs, and many others. Recent advances in LED technology have provided efficient and robust full-spectrum lighting sources that enable a variety of lighting effects in many applications. Some of the fixtures embodying these sources feature a lighting module, including one or more LEDs capable of producing different colors, e.g. red, green, and blue, as well as a processor for independently controlling the output of the LEDs in order to generate a variety of colors and color-changing lighting effects.

LED-based lighting fixtures, arrays, and systems have been implemented that enable groups of light sources in the lighting fixtures to be individually controlled. For example, LED-based lighting array may include a plurality of LED segments, each containing one or more LEDs, that may be individually controlled (e.g., segments that may be individually turned on/off). A controller may be utilized to individually control each of the LED segments. Although such LED-based lighting fixtures enable individualized control of LED segments, the sensors that provide data to the controller to enable the controller to determine how to control each of the LED segments may have one or more drawbacks. For example, passive infrared (PIR) sensors and/or acoustic sensors may be utilized to provide data to a controller concerning presence of an individual and the controller may activate LED segments upon detection of presence of an individual. However, PIR sensors may be bulky, consume too much power, and/or be overly sensitive to heat thereby limiting options for implementation in a lighting unit. Also, acoustic sensors may be bulky, consume too much power, and/or be overly sensitive to noise thereby limiting options for implementation in a lighting unit.

Thus, there is a need in the art to provide lighting units and arrays, addressing one or more drawbacks of existing solutions.

SUMMARY

The present disclosure is directed to inventive methods and apparatus for LED-based lighting units and arrays with selectively controlled segments, equipped with a radar for enabling presence detection. For example, a radar circuit may be electrically coupled to conductive wiring of the LED based lighting unit that at least selectively powers the radar circuit and at least selectively powers the LEDs. In some embodiments, an antenna coupled to the radar circuit may be formed from the conductive wiring and optionally at least partially isolated from any current flowing through the LEDs.

Generally, in one aspect, a LED-based lighting unit with implemented radar is provided and includes a plurality of LEDs, conductive wiring electrically coupling the LEDs in a series parallel configuration, and a radar circuit electrically coupled to a first portion of the conductive wiring. The first portion of the conductive wiring at least selectively powers the radar circuit and at least selectively powers the LEDs. A radar antenna is electrically coupled to the radar circuit.

In some embodiments, the radar antenna is formed from a second portion of the conductive wiring having a length substantially matching a radar frequency of the radar circuit.

In some embodiments, the LEDs include a plurality of individually controllable LED groups. In some versions of those embodiments the individually controllable LED groups are controlled based on radar frequency signals received at the radar circuit via the radar antenna.

In some embodiments, the radar circuit is connected in the series parallel configuration with at least some of the LEDs.

In some embodiments, the radar antenna is antenna wiring sharing a substantially common gauge with the conductive wiring. In some versions of those embodiments the antenna wiring and the conductive wiring were previously cohesively formed with one another.

In some embodiments, the LED-based lighting unit further includes a controller in electrical communication with the radar circuit and the LEDs. The controller detects presence events via input from the radar circuit. In some versions of those embodiments the controller alters at least one light output characteristic of the LEDs in correspondence with the presence events. In some versions of those embodiments the controller transmits detection of the presence events to a remote receiver. In some versions of those embodiments the LEDs include a plurality of individually controllable LED groups and the controller adjusts current provided to at least one of the individually controllable LED groups in correspondence with the presence events. In some versions of those embodiments the controller determines a presence event locationally corresponding LED group of the LED groups via input from the radar circuit and directs the at least one light output characteristic of the presence event locationally corresponding LED group.

In some embodiments, the radar circuit includes a capacitor coupled to the first portion of the conductive wiring, the LEDs are powered by pulse width modulation, and the capacitor stores energy during highs of the pulse width modulation and discharges during lows of the pulse width modulation.

Generally, in another aspect, a method of implementing a radar in a LED-based lighting unit is provided and includes the steps of: electrically connecting a radar circuit to LED wiring that electrically interconnects a plurality of LEDs of the LED-based lighting unit; isolating a segment of the LED wiring from a current path for current flowing through the LEDs; and connecting the segment of the LED wiring to an antenna input of the radar circuit.

In some embodiments, the method further includes cutting the LED wiring to electrically isolate the segment of the LED wiring.

In some embodiments, the radar circuit is connected in series parallel configuration with the LEDs.

The method may further include electrically connecting a second radar circuit to the LED wiring; isolating a second segment of the LED wiring from the current path; and connecting the segment of the LED wiring to a second antenna input of the second radar circuit. In some versions of those embodiments the first radar circuit is in series parallel configuration with a first group of the LEDs and the second radar circuit is in series parallel configuration with a distinct second group of the LEDs.

Generally, in another aspect, a method of powering a plurality of LEDs electrically connected to one another and a radar circuit is provided and includes the steps of: providing power to a plurality of LEDs via a wire grid during a plurality of first time periods; and providing power to a radar circuit via the wire grid during a plurality of second time periods; wherein the LEDs are unpowered during the second time periods; and wherein the first time periods and the second time periods are mutually exclusive. The method may further include storing power provided during the first time periods, wherein the stored power is provided to the radar circuit during the second time periods.

As used herein for purposes of the present disclosure, the term "LED" should be understood to include any electroluminescent diode or other type of carrier injection/junction-based system that is capable of generating radiation in response to an electric signal. Thus, the term LED includes, but is not limited to, various semiconductor-based structures that emit light in response to current, light emitting polymers, organic light emitting diodes (OLEDs), electroluminescent strips, and the like. In particular, the term LED refers to light emitting diodes of all types (including semi-conductor and organic light emitting diodes) that may be configured to generate radiation in one or more of the infrared spectrum, ultraviolet spectrum, and various portions of the visible spectrum (generally including radiation wavelengths from approximately 400 nanometers to approximately 700 nanometers).

For example, one implementation of an LED configured to generate essentially white light (e.g., a white LED) may include a number of dies which respectively emit different spectra of electroluminescence that, in combination, mix to form essentially white light. In another implementation, a white light LED may be associated with a phosphor material that converts electroluminescence having a first spectrum to a different second spectrum. In one example of this implementation, electroluminescence having a relatively short wavelength and narrow bandwidth spectrum "pumps" the phosphor material, which in turn radiates longer wavelength radiation having a somewhat broader spectrum.

It should also be understood that the term LED does not limit the physical and/or electrical package type of an LED. For example, as discussed above, an LED may refer to a single light emitting device having multiple dies that are configured to respectively emit different spectra of radiation (e.g., that may or may not be individually controllable). Also, an LED may be associated with a phosphor that is considered as an integral part of the LED (e.g., some types of white LEDs). In general, the term LED may refer to packaged LEDs, non-packaged LEDs, surface mount LEDs, chip-on-board LEDs, T-package mount LEDs, radial package LEDs, power package LEDs, LEDs including some type of encasement and/or optical element (e.g., a diffusing lens), etc.

The term "light source" should be understood to refer to any one or more of a variety of radiation sources, including, but not limited to, LED-based sources (including one or more LEDs as defined above), incandescent sources (e.g., filament lamps, halogen lamps), fluorescent sources, phosphorescent sources, high-intensity discharge sources (e.g., sodium vapor, mercury vapor, and metal halide lamps), lasers, and other types of electroluminescent sources.

A given light source may be configured to generate electromagnetic radiation within the visible spectrum, outside the visible spectrum, or a combination of both. Hence, the terms "light" and "radiation" are used interchangeably herein. Additionally, a light source may include as an integral component one or more filters (e.g., color filters), lenses, or other optical components. Also, it should be understood that light sources may be configured for a variety of applications, including, but not limited to, indication, display, and/or illumination. An "illumination source" is a light source that is particularly configured to generate radiation having a sufficient intensity to effectively illuminate an interior or exterior space. In this context, "sufficient intensity" refers to sufficient radiant power in the visible spectrum generated in the space or environment (the unit "lumens" often is employed to represent the total light output from a light source in all directions, in terms of radiant power or "luminous flux") to provide ambient illumination (i.e., light that may be perceived indirectly and that may be, for example, reflected off of one or more of a variety of intervening surfaces before being perceived in whole or in part).

The term "lighting fixture" is used herein to refer to an implementation or arrangement of one or more lighting units in a particular form factor, assembly, or package. The term "lighting unit" is used herein to refer to an apparatus including one or more light sources of same or different types. A given lighting unit may have any one of a variety of mounting arrangements for the light source(s), enclosure/housing arrangements and shapes, and/or electrical and mechanical connection configurations. Additionally, a given lighting unit optionally may be associated with (e.g., include, be coupled to and/or packaged together with) various other components (e.g., control circuitry) relating to the operation of the light source(s). An "LED-based lighting unit" refers to a lighting unit that includes one or more LED-based light sources as discussed above, alone or in combination with other non LED-based light sources. A "multi-channel" lighting unit refers to an LED-based or non LED-based lighting unit that includes at least two light sources configured to respectively generate different spectrums of radiation, wherein each different source spectrum may be referred to as a "channel" of the multi-channel lighting unit.

The term "controller" is used herein generally to describe various apparatus relating to the operation of one or more light sources. A controller can be implemented in numerous ways (e.g., such as with dedicated hardware) to perform various functions discussed herein. A "processor" is one example of a controller which employs one or more microprocessors that may be programmed using software (e.g., microcode) to perform various functions discussed herein. A controller may be implemented with or without employing a processor, and also may be implemented as a combination of dedicated hardware to perform some functions and a processor (e.g., one or more programmed microprocessors and associated circuitry) to perform other functions. Examples of controller components that may be employed in various embodiments of the present disclosure include, but are not limited to, conventional microprocessors, application specific integrated circuits (ASICs), and field-programmable gate arrays (FPGAs).

In various embodiments, a processor or controller may be associated with one or more storage media (generically referred to herein as "memory," e.g., volatile and non-volatile computer memory such as RAM, PROM, EPROM, and EEPROM, floppy disks, compact disks, optical disks, magnetic tape, etc.). In some embodiments, the storage media may be encoded with one or more programs that, when executed on one or more processors and/or controllers, perform at least some of the functions discussed herein. Various storage media may be fixed within a processor or controller or may be transportable, such that the one or more programs stored thereon can be loaded into a processor or controller so as to implement various aspects of the present invention discussed herein. The terms "program" or "computer program" are used herein in a generic sense to refer to any type of computer code (e.g., software or microcode) that can be employed to program one or more processors or controllers.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION

LED-based lighting fixtures and arrays have been implemented that enable groups of light sources within such fixtures and arrays to be individually controlled. Although such lighting fixtures enable individualized control of groups of light sources, the sensors utilized in such individualized control have one or more drawbacks. For example, the sensors may be bulky, consume too much power, be overly sensitive to heat, and/or overly sensitive to noise thereby limiting options for implementation in a lighting unit. Thus, Applicants have recognized and appreciated a need in the art to provide lighting units with a radar for presence detection that optionally overcomes one or more drawbacks of existing lighting units.

More generally, Applicants have recognized and appreciated that it would be beneficial to provide methods and apparatus related to a LED-based lighting unit having a radar device for presence detection.

In view of the forgoing, various inventive methods and apparatus disclosed herein relate to a lighting unit with implemented radar device.

In the following detailed description, for purposes of explanation and not limitation, representative embodiments disclosing specific details are set forth in order to provide a thorough understanding of the claimed invention. However, it will be apparent to one having ordinary skill in the art having had the benefit of the present disclosure that other embodiments according to the present teachings that depart from the specific details disclosed herein remain within the scope of the appended claims. Moreover, descriptions of well-known apparatuses and methods may be omitted so as to not obscure the description of the representative embodiments. Such methods and apparatuses are clearly within the scope of the claimed invention. For example, various embodiments of the methods and apparatus disclosed herein are particularly suited for utilizing data from at least one radar of a LED-based lighting unit to adjust light output of LEDs of the LED-based lighting unit. Accordingly, for illustrative purposes, the claimed invention is often discussed in conjunction with such light output adjustment implementation. However, other configurations and applications of this approach are contemplated without deviating from the scope or spirit of the claimed invention. For example, in some embodiments the data from at least one radar of the LED-based lighting unit may additionally and/or alternatively utilized for other purposes such as monitoring pedestrian traffic, monitoring activity for a security system, and/or monitoring activity for a building management system.

Figure 1:
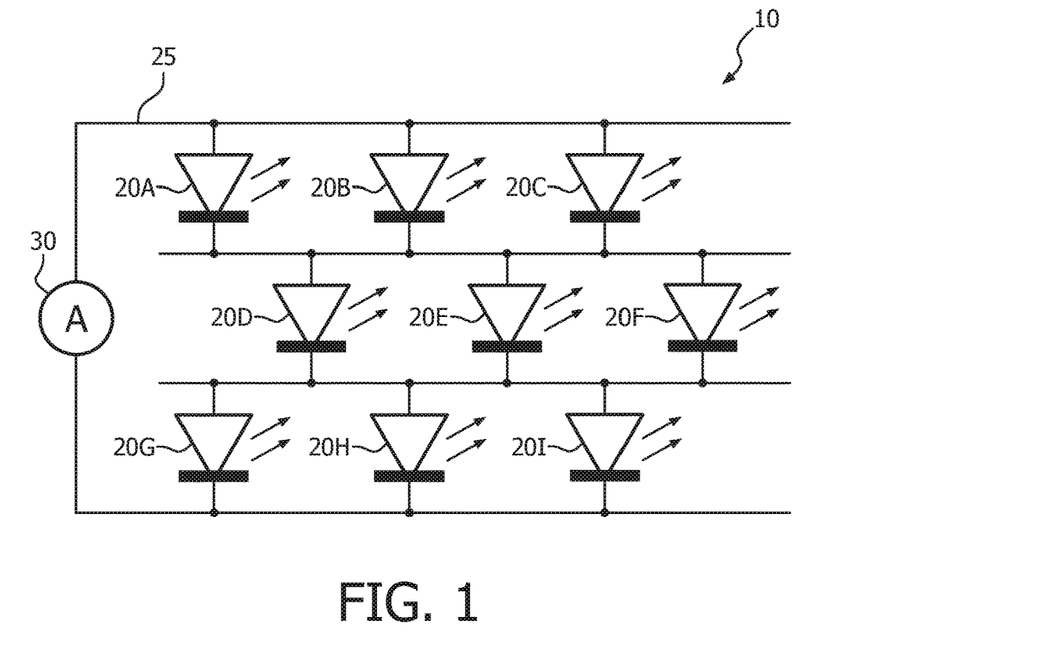
FIG. 1 illustrates a LED-based lighting unit having a plurality of LEDs connected in a series parallel configuration.

FIG. 1 illustrates an LED-based lighting unit 10 having a plurality of LEDs 20A-I connected in a series parallel configuration with one another via wiring grid 25. The LEDs 20A-I include three sets of LEDs (20A-C; 20D-F; and 20G-I) connected in series with one another, with each of the three sets of including three of LEDs 20A-I connected in parallel with one another. A power supply 30 is connected between the anode of the first set of LEDs 20A-C and the cathode of the LEDs in the last set of LEDs 20G-I. The power supply 30 is utilized to power the LEDs 20. In some embodiments the power supply 30 may be a LED-driver that may be powered by a power source such as a battery and/or a mains power supply. In some embodiments the power supply 30 may include a controller for adjusting the parameters of power provided to the LEDs 20A-I.

In some embodiments the wiring 25 may be a metal wire that electrically and mechanically interconnects the LEDs 20 in a mesh configuration. In some embodiments the wiring 25 may enable the LEDs 20 to be provided without a PCB. For example, in some embodiments the LEDs 20 may be electrically coupled to and wholly mechanically supported by the wiring 25. In some embodiments the wiring 25 may be rigid and/or fix the positioning of the LEDs 20 relative to one another. For instance, the metal mesh wire may be fixedly deformable by a user to a plurality of shapes thereby enabling a plurality of adjustments to the position of the LEDs 20 relative to one another. Such metal mesh wire configuration may be arranged in two dimensions (flat) or may optionally be flexed and/or fixedly deformed into three dimensions (e.g., formed to fit over a pre-existing structure, formed into a three dimensional shape, temporarily flexed). In some embodiments the wiring 25 may be cut from a larger mesh type metal wire grid having a plurality of interconnected LEDs. In some embodiments the wiring 25 may optionally be electrically and/or mechanically interconnected with additional separate mesh type metal wire grids.

Figure 2:
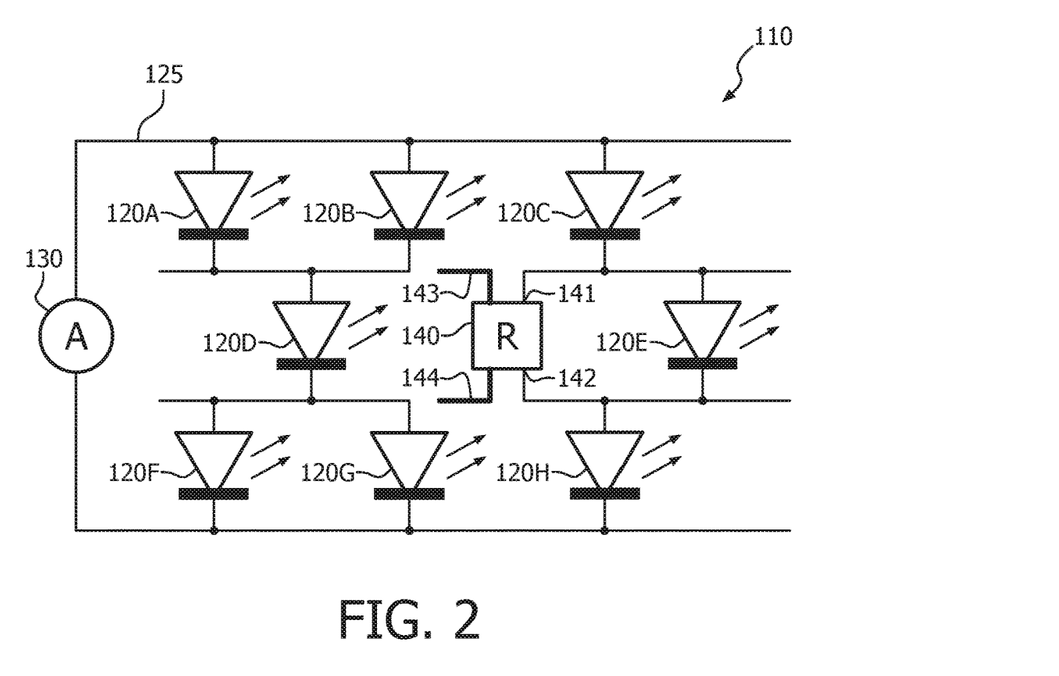
FIG. 2 illustrates an embodiment of a LED-based lighting unit having a power supply, a plurality of LEDs connected in a series parallel configuration, and an implemented radar circuit.

FIG. 2 illustrates an embodiment of a LED-based lighting unit 110 having a plurality of LEDs 120A-H connected in a series parallel configuration with one another via wiring grid 125. A power supply 130 is connected between the anode of the LEDs 120A-C and the cathode of the LEDs 120F-H. The power supply 130 is utilized to power the LEDs 120A-H and to power a radar circuit 140. In some embodiments the power supply 130 may be a LED-driver powered by a power source such as a battery and/or a mains power supply. In some embodiments the power supply 130 may include a controller for adjusting the parameters of power provided to the LEDs 120A-H.

The radar circuit 140 is connected to the wiring grid 125 in parallel with LED 120E and in series with LED 120C and LED 120H via power connections 141, 142. Power is supplied to the radar circuit 140 from the power supply 130 via power connections 141, 142. Wiring portions 143, 144 are coupled to the antenna inputs of the radar circuit 140 and function as the antenna for the radar circuit 140. The wiring portions 143, 144 are electrically isolated from the power that is being supplied to the LEDs 120A-H and radar circuit 140 via power supply 130. In some embodiments the wiring portions 143, 144 may be the same gauge and/or material construct as the wiring used throughout the rest of the wiring grid 125. In some versions of those embodiments the wiring portions 143, 144 may have formed a portion of the wiring grid 125 prior to being disconnected therefrom. For example, in some embodiments the wiring portion 143 may have been connected to the wiring 125 on the anode side of the LED 120D and the wiring portion 144 may have been connected to the wiring on the cathode side of the LED 120D prior to being disconnected from the wiring grid 125.

The radar circuit 140 contains the necessary electrical components to enable operation as a passive and/or active radar. In some embodiments the radar circuit 140 may include one or more of a frequency generation element, a frequency receiving element, and a controller. The controller may interface with the frequency generation element to create outgoing RF radar signals and/or may interface with the frequency receiving element to analyze incoming RF signals for motion, presence, and/or other characteristic. In some embodiments the radar circuit 140 is a micropower impulse radar (MIR) that may optionally utilize a center frequency of approximately 1.95 GHz. In some embodiments the combined length of the wiring portions 143, 144 may be approximately half the wavelength of the RF signals generated and/or received by the radar circuit 140 via wiring portions 143, 144.

In some embodiments, the radar circuit 140 may communicate with one or more devices such as the power supply 130. For example, the radar circuit 140 may transmit RF communication signals from the radar circuit 140 and/or generate coded light that may be received at the power supply 130 (e.g., directly or indirectly controlling light output of one or more of the LEDs 120A-H and/or a separate LED). Also, for example, the radar circuit 140 may utilize the wiring grid 125 to communicate with the controller 130 utilizing I2C and/or other protocol. In some embodiments the power supply 130 may adjust one or more light output characteristics of LEDs 120A-H based on input received from the radar circuit 140. For example, in some embodiments the controller 130 may increase the brightness of the LEDs 120A-H when input received from the radar circuit 140 indicates that an individual is present in close proximity to the radar circuit 140.

In some embodiments, the LED-based lighting unit 110 of FIG. 2 may be created by omitting the LED 120I of FIG. 1, putting the radar circuit 120 in its place in the wiring grid 25, and cutting a portion of the wiring grid 25 to form the wiring portions 143, 144. In some embodiments the radar circuit 140 may be implemented in a LED-based lighting unit via connection in parallel with one or more of the LEDs of the LED-based lighting unit and cutting a portion of the wiring grid of the LED-based lighting unit to form the wiring portions 143, 144. In some embodiments a radar circuit having its own antenna (not formed from a portion of the wiring grid) may be implemented in a LED-based lighting unit via connection to the wiring powers one or more of the LEDs of the LED-based lighting unit.

Figure 3:
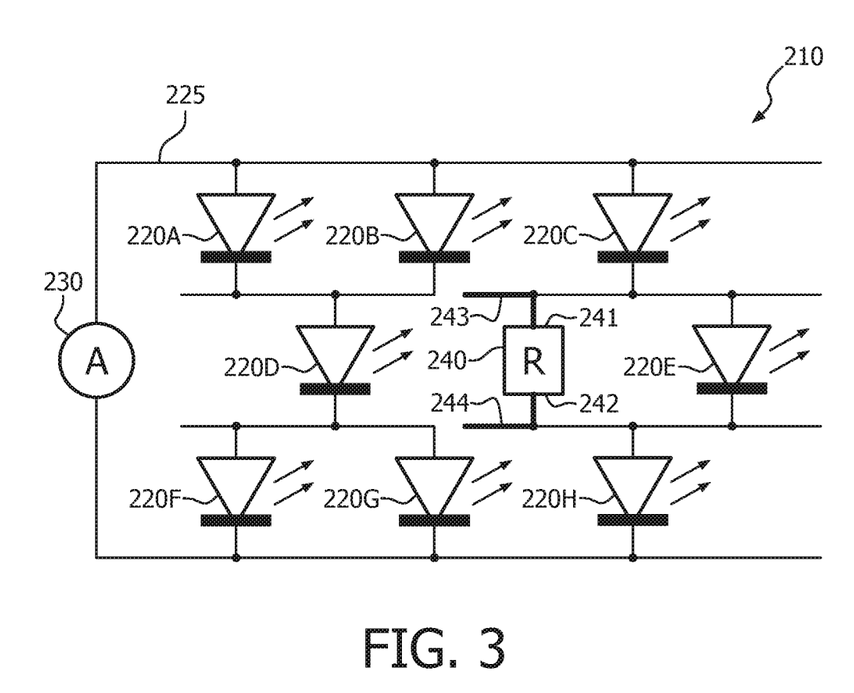
FIG. 3 illustrates another embodiment of a LED-based lighting unit having a power supply, a plurality of LEDs connected in a series parallel configuration, and an implemented radar circuit.

FIG. 3 illustrates another embodiment of a LED-based lighting unit 210 having a plurality of LEDs 220A-H. A power supply 230 is connected between the anode of the LEDs 220A-C and the cathode of the LEDs 220F-H. The power supply 230 is utilized to power the LEDs 220A-H and to power a radar circuit 240. In some embodiments the power supply 230 may be a LED-driver powered by a power source. The radar circuit 240 is connected to the wiring grid 225 in parallel with LED 220E and in series with LED 220C and LED 220H via power and antenna connections 241, 242. Power is supplied to the radar circuit 240 from the power supply 230 via power and antenna connections 241, 242. Wiring portions 243, 244 are also coupled to the radar circuit 240 at power and antenna connections 241, 242 and function as the antenna for the radar circuit 240. Electrical power provided to the radar circuit 240 is carried over a portion of each of the wiring portions 243, 244 leading to power connections 241, 242 and a portion of each of the wiring portions 243, 244 does not carry current from the power powering radar circuit 240 (the portions distal from power and antenna connections 241, 242). In some embodiments, the wiring portions 243, 244 may be the same gauge and material construct as the wiring used throughout the rest of the wiring grid 225. In some versions of those embodiments the wiring portions 243, 244 may have formed a portion of the wiring grid 225 prior to being disconnected therefrom. For example, in some embodiments the wiring portion 243 may have been connected to the wiring on the anode side of the LED 220D and the wiring portion 244 may have been connected to the wiring on the cathode side of the LED 220D prior to being disconnected from the wiring grid 225.

The radar circuit 240 contains the necessary electrical components to enable operation as a passive and/or active radar. The radar circuit 240 may optionally share one or more common aspects with the radar circuit 140. In some embodiments the radar circuit 240 may communicate with one or more devices such as the power supply 230. In some embodiments the LED-based lighting unit 210 of FIG. 3 may be created by omitting the LED 120I of FIG. 1, putting the radar circuit 240 in its place in the wiring grid 25, and cutting a portion of the wiring grid 25 to form the wiring portions 243, 244.

In some embodiments, the radar signal generated by the radar circuit 240 may be higher in frequency than the driving signal for the LEDs 220A-H but much lower in power. In some embodiments the driving voltage for powering the LEDs 220A-H and the radar circuit 240 can be configured so that the radar circuit 240 is active in the periods that the LEDs 220 are off and the driving voltage can be regulated so that the LEDs 220 do not interfere with the radar signal. For example, in some embodiments a capacitor may be implemented in the radar circuit 240 and the frequency of the radar signal and the frequency of the pulse width modulation (PWM) signal driving the LEDs 220 may be aligned. The capacitor may store energy during highs of the PWM signal during time periods in which the LEDs 220 are active and the radar circuit 240 may utilize such stored energy to transmit and/or receive radar signals during lows of the PWM signal during time periods in which the LEDs 220 are inactive. In such an example the rate at which the radar is active will be determined by the duty cycle of the LEDs 220 and this may be set to a sufficiently high level to enable desired operation of the radar circuit 240. Optionally, one or more of those LEDs connected adjacent to the radar circuit 240 (LEDs 220C, 220E, and/or 220H) may be paired with control electronics that ensure that those LEDs are not powered and/or connected when the radar is active.

Figure 4:
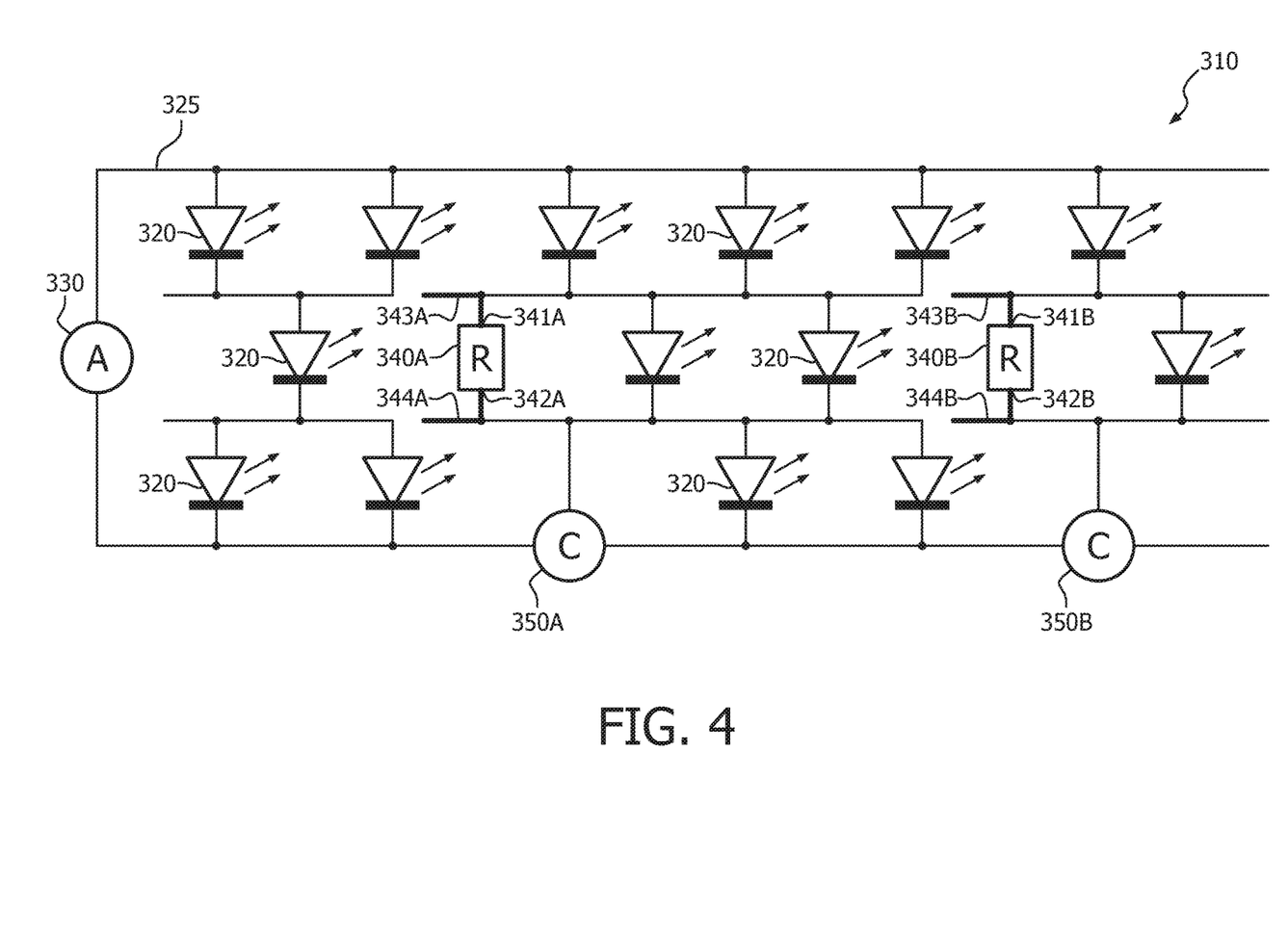
FIG. 4 illustrates another embodiment of a LED-based lighting unit having a power supply, a plurality of LEDs connected in a series parallel configuration, and two implemented radar circuits.

FIG. 4 illustrates another embodiment of a LED-based lighting unit 310 having a plurality of LEDs 320 connected in a series parallel configuration and two implemented radar circuits 340A and 340B. Each of the radar circuits 340A, 340B are implemented in a series parallel configuration with the LEDs 320, optionally in a similar manner as discussed with radar circuit 240 of FIG. 3.

A power supply 330 is electrically connected to and powers the LEDs 320 and the radar circuits 340A, 340B. In some embodiments the power supply 330 may be a LED-driver powered by a power source. The radar circuit 340A is connected to the wiring grid 325 via power and antenna connections 341A, 342A and the radar circuit 340B is connected to the wiring grid 325 via power and antenna connections 341B, 342B. Wiring portions 343A, 344A are coupled to the radar circuit 340A at power and antenna connections 341B, 342B and function as the antenna for the radar circuit 340A. Wiring portions 343B, 344B are coupled to the radar circuit 340B at power and antenna connections 341B, 342B and function as the antenna for the radar circuit 340B. The radar circuits 340A, 340B contain the necessary electrical components to enable operation as a passive and/or active radar. The radar circuits 340A, 340B may optionally share one or more common aspects with the radar circuits 140 and/or 240.

A first controller 350A is connected in series between the radar circuit 340A and the power circuit 330B and is in the current return path for a plurality of the LEDs 320. The second controller 350B is connected in series between the radar circuit 340B and is in the current return path for a plurality of the LEDs 320. In some embodiments the controllers 350A, 350B may be positionally placed in the wiring 325 in place of an LED. In some embodiments the controllers 350A, 350B may be placed in the wiring in combination with a LED (e.g., directly alongside an LED). The controllers 350A, 350B may each control the amount of current that can flow therethrough and by doing so may control the light output of LEDs 320 that are connected to the current return path upstream of each of the controllers 350A, 350B. The controller 350A may be in communication with the radar circuit 340A, the controller 350B, and/or the power supply 330. The controller 350B may be in communication with the radar circuit 340B, the controller 340A, and/or the power supply 330. The communications may utilize wired and/or wireless communications (e.g., I2C or other two wire bus, coded light transmitted via one or more of LEDs 320 or other LEDs, and/or RF communication signals). Via communication between the components 330, 340A, 340B, 350A, and/or 350B light output of certain LED groups of the LEDs 320 may be individually adjusted (e.g., dimmed, switched on or off, and/or color adjusted) based on detections from the radar circuits 340A, 340B. For example, the brightness of one or more LED groups may be increased through current control manipulation via controllers 350A and/or 350B when a corresponding of the radar circuits 340A, 340B detects presence of an individual.

Although only two radars 340A, 340B and two controllers 350A, 350B are illustrated in FIG. 4, one of ordinary skill in the art, having had the benefit of the present disclosure, will recognize and appreciate that additional LEDs, radars and/or controllers may be implemented to create additional controllable LED groups that may be individually controlled based on input from the radars.

Also, although controllers 350A, 350B are illustrated and described herein, one of ordinary skill in the art, having had the benefit of the present disclosure, will recognize and appreciate that additional and/or alternative devices may be utilized to individually control light output of one or more groups of LEDs based on input from the radars. For example, groups of LEDs in series may be controlled by using field-effect transistors (FETs) connected in parallel with one or more LEDs of the groups of LEDs to selectively short circuit the LEDs connected in parallel with the FETs. For example, the state of each of the FETs may be individually manipulated to either short LEDs of the corresponding LED grouping (turning the LEDs "off") or to allow powering of the LEDs of the corresponding LED grouping (turning the LEDs "on").

Figure 5:
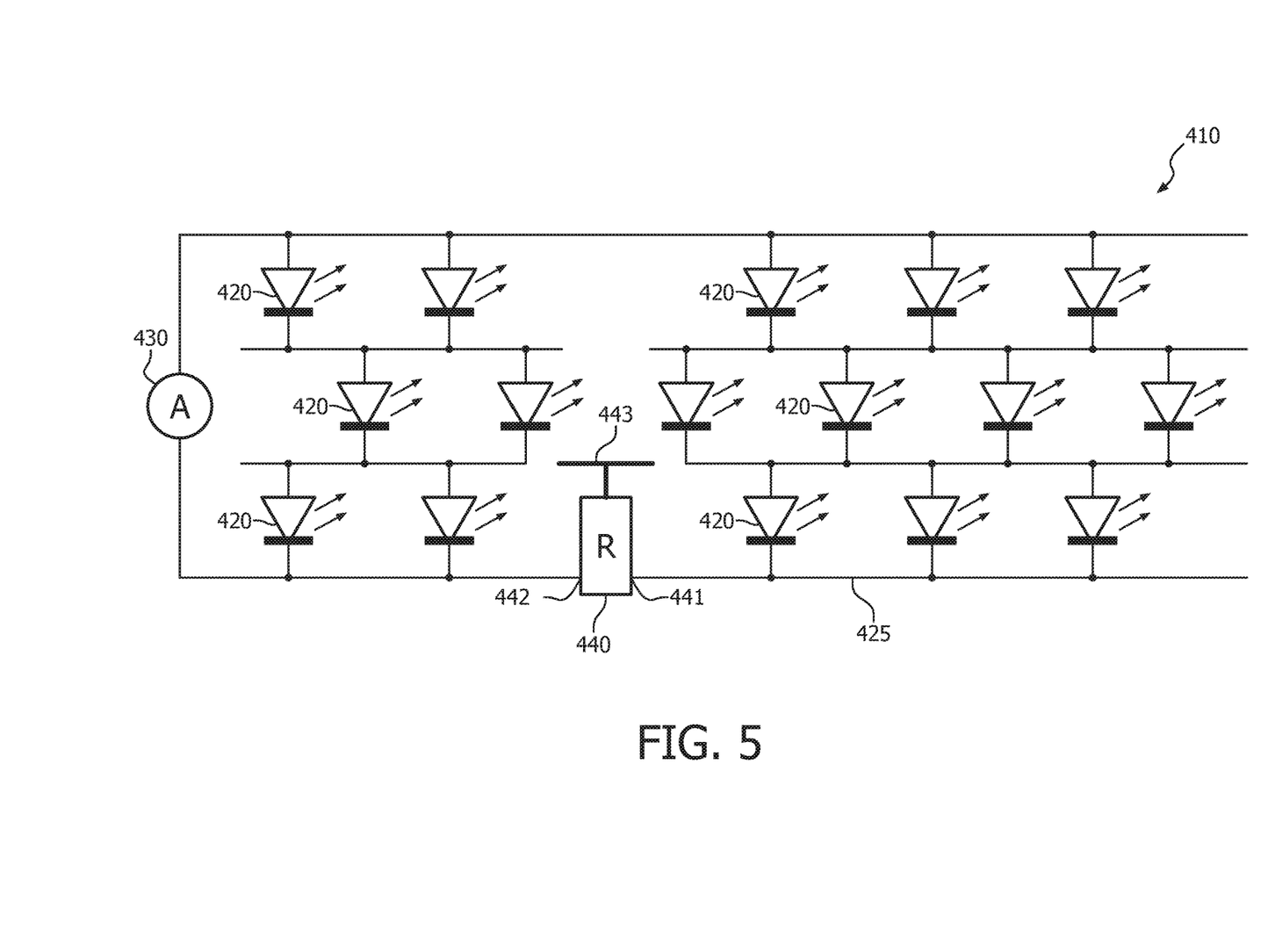
FIG. 5 illustrates another embodiment of a LED-based lighting unit having a power supply, a plurality of LEDs connected in a series parallel configuration, and an implemented radar circuit in the current return path of a plurality of the LEDs.

FIG. 5 illustrates another embodiment of a LED-based lighting unit 410 having a plurality of LEDs 420 connected in a series parallel configuration. A radar circuit 440 is positioned in the current return path to the power supply 430 for a plurality of the LEDs 420. The wiring 425 has been cut above the radar circuit 440 on the cathode side of two LEDs 420 to form wiring segment 443 that functions as the antenna of the radar circuit 440 and has also been cut on the anode side of the same two LEDs to avoid an alternative flow path for the current. The radar circuit 440 is connected to the wiring grid 425 in in the current return path via power connections 441, 442. Power is supplied to the radar circuit 440 from the power supply 430 via power connections 441, 442.

The radar circuit 440 may include circuitry to control the amount of current that can flow therethrough and by doing so may control the light output of LEDs 420 that are connected upstream of the radar circuit 440 in the current return path. Based on received RF radar signals, the radar circuit 440 may adjust light output of LEDs 420 that are connected upstream in the current return path of the radar circuit 440 via current control. Although only a single radar circuit 440 with integrated controller is illustrated in FIG. 5, one of ordinary skill in the art, having had the benefit of the present disclosure, will recognize and appreciate that additional LEDs and radar circuits with integrated controller may be implemented to create additional controllable LED groups that may be individually controlled based on received RF signals at the radars.

In some embodiments, lighting units described herein may be implemented in a configuration where the distance to a user is relatively small (e.g., less than 2 meters) and/or where the resolution of the radar detection is relatively high. In such configurations one or more radars of the lighting units may be capable of detecting user gestures and the light sources of the lighting units may be controlled based on the user gestures. For example, arm and/or hand gestures may be recognized.

In some embodiments, lighting units described herein may be implemented with a plurality of radars that may be cooperatively operated to form a phased scanning array radar utilizing the principle of beam-forming. A phased scanning array is composed of a plurality of radars and radar signals are formed by shifting the phase of the signal emitted from each of the radars to provide constructive or destructive interference so as to steer radar signals in a desired direction. Beam-forming generally refers to the signal processing technique used to control the directionality of the reception and/or transmission of a radar signal. In a phased scanning array radar several radars may use the same single source but introduce a delay between the signal fed to various antennas. When the radar signals are emitted they combine whereby the phase delays cause an interference pattern. This allows beamforming allowing the radar to scan various locations in the room. In some embodiments a phased scanning array may be implemented utilizing a single radar with a plurality of wires of various lengths. The various lengths of the wires may be used to delay the radar signal to create the required interference pattern. This constructive and destructive interference can be used to direct the main power of the radar to a part of the room instead of the whole room. This would allow localization of persons in the room enabling particularized control of light sources of the lighting units based on a particular identified position (e.g., to create a spotlight on an individual, to increase light output at and/or around an individual).

As discussed herein, the antenna(e) of a radar may have a length that substantially matches with at least one of the frequencies used by the radars. For example, in some embodiments a MIR radar with a center frequency of 1.95 Ghz may have an antenna length of approximately 4 cm. Also, for example, in some embodiments a X-band radar with a frequency of 8-12.5 Ghz may have an antenna length of approximately 1 cm. Also, for example, in some embodiments a K-band radar may have an antenna length of approximately 0.5 cm.

In some embodiments the radars described herein may additionally and/or alternatively be used as a passive radar and pick-up RF signals from the environment. Multiple radars may optionally be utilized throughout the lighting unit with different lengths of antennae. The different lengths of antennae allow the lighting unit to pickup up a broad range of RF signals of different frequencies. For example, a plurality of radars may be utilized with different length antennae to enable distinguishing between signals coming from wireless internet in the 2.4 or 5 GHz range as well as GSM which operates in the 900/1800 Mhz range. In some embodiments the passive radars may be utilized to detect presence of individuals via detection of signals common with personal devices carried by individuals. For example, passive detection of a moving wireless internet signal may occur as user moves with a tablet device having wireless connectivity. The lighting unit may determine such moving wireless internet signal indicates presence and transmit such determination to another device and/or modify one or more aspects of the lighting unit based on such determination. Also, for example, the lighting unit may determine the detection of a GSM signal indicates that a user is present.

In some embodiments, both passive and active radars may be utilized (either two separate radars or two separate modes from a single radar). For example, a radar may be active in both an active and a passive mode to save energy. For instance, initially the radar may be in passive mode, and when the passive radar detects the presence of a mobile personal device it may then switch to the active mode to determine the particular location of the user in the room.

In some embodiments, one or more radars of a lighting unit may be utilized to monitor RF signals from the surrounding area to determine the shape of the lighting unit and to adjust the configuration of the light output of the lighting unit create a desired light pattern dependent of the shape of the lighting unit. For example, in some embodiments the lighting unit may be configured to form a variety of shapes and/or sizes (e.g., the LEDs and wiring may be cut from a longer "sheet" of LEDs and wiring). Multiple radars in the lighting unit may communicate and awareness of position of the radars relative to one another known. By comparing the difference in received RF signals at the radars the shape and/or size of the lighting unit may be determined and one or more light output characteristics adjusted accordingly (e.g., to achieve a desired light distribution pattern).

In some embodiments, locally detected presence or gestures may be utilized to create a light effect only at the corresponding segment of the LED structure. For example, a light effect may only be implemented at the LED group corresponding to the radar detecting the presence or gesture. Also, for example, a light effect may only be implemented at the corresponding segment of the LED structure corresponding to the location of the presence and/or gesture as determined via analysis of one or more received RF radar signals. For instance, a natural fade in, with a time-out period and fade out effect may be utilized in response to detected presence to create a pleasant experience for end-users. In some embodiments a "follow-me" type of effect may be implemented based on input from multiple radars. For example, the follow-me type of effect may be implemented by predicting directions and pathways based on a keeping history, recognizing patterns, and/or a learning algorithm such that anticipatory light effects could be created. Also, for example, information on detected presence via a radar may be shared with the entire LED lighting unit. For instance, upon detecting local presence either the entire LED structure may create a uniform light effect, or the "presence-detected segment" may create light as high intensity, the adjacent segments may create light at medium intensity and other segments in the room may create light at the lowest intensity.

Figure 6:
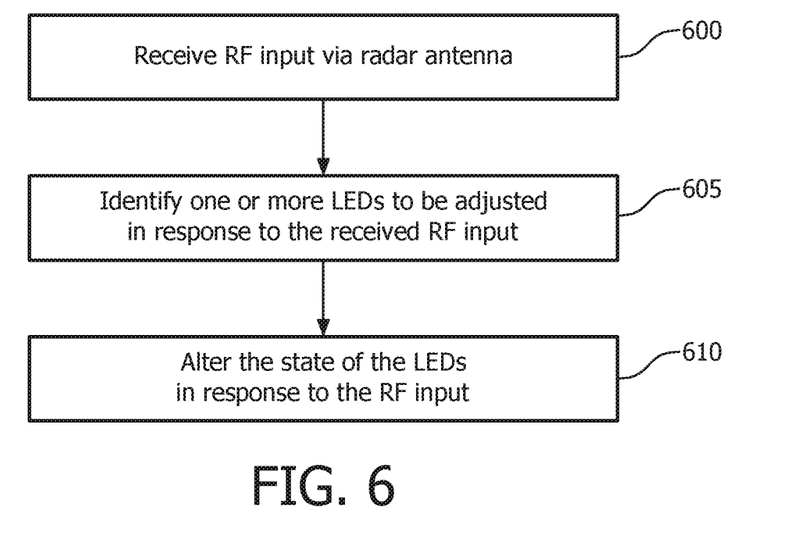
FIG. 6 illustrates an embodiment of a method of adjusting light output of LEDs in response to a received radar input.

FIG. 6 illustrates an embodiment of a method of adjusting light output of LEDs in response to a received radar input. Other embodiments may perform the steps in a different order, omit certain steps, and/or perform different and/or additional steps than those illustrated in FIG. 6. In some embodiments a controller, such as controller of controllers 350A, 350B, a controller of radar circuits 140, 240, 340A, 340B, 440 and/or a controller of power supplies 130, 230, 330, 430, may perform the steps of FIG. 6. At step 600 RF input is received via a radar antenna. For example, one of radar circuits 140, 240, 340A, 340B, and/or 440 may receive RF input via an antenna thereof. The RF input may be received when the radar is acting in a passive mode or when it is acting in an active mode. At step 605 one or more LEDs are identified to be adjusted in response to the RF input. For example, the one or more LEDs may be identified based on which of the radar circuits received the RF input. At step 610 the state of the identified LEDs is altered in response to the RF input. For example, one or more parameters of the power supplies 130, 230, 330, 430 may be adjusted to alter the state of the LEDs. Also, for example, controllers 350A, 350B and/or radar circuit 440 may adjust current flowing through certain LEDs in response to the RF input.

Figure 7:
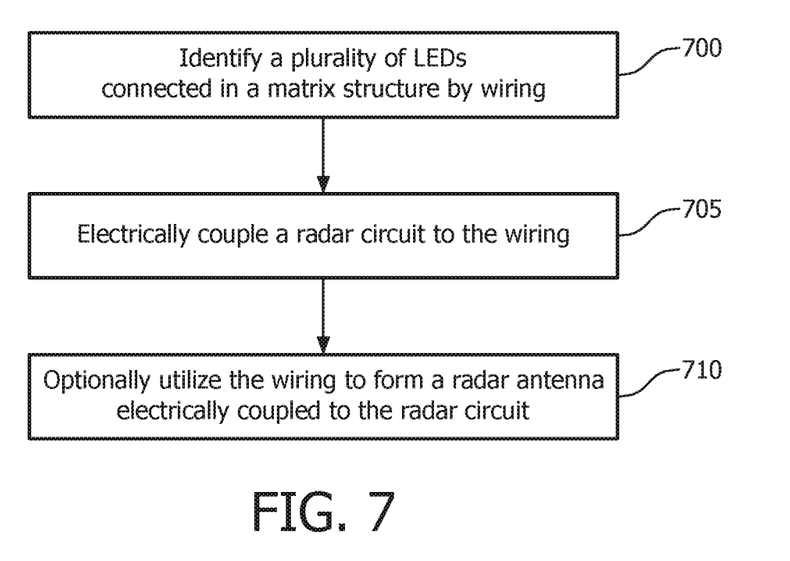
FIG. 7 illustrates an embodiment of a method of implementing a radar in a LED-based lighting unit.

FIG. 7 illustrates an embodiment of a method of implementing a radar in a LED-based lighting unit. Other embodiments may perform the steps in a different order, omit certain steps, and/or perform different and/or additional steps than those illustrated in FIG. 7. At step 700 a plurality of LEDs connected in a matrix structure by wiring are identified. At step 705 a radar circuit is electrically coupled to the wiring. At step 710 the wiring is optionally utilized to form a radar antenna electrically coupled to the radar circuit. For example, as described herein a previously cohesively formed portion of the wiring may optionally be cut to form the radar antenna. In some other embodiments a radar antenna may be formed by other structure besides the wiring.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

It should also be understood that, unless clearly indicated to the contrary, in any methods claimed herein that include more than one step or act, the order of the steps or acts of the method is not necessarily limited to the order in which the steps or acts of the method are recited.

Reference numerals appearing in the claims are provided merely for convenience and should not be construed as limiting the claims in any way.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A method of powering a plurality of LEDs electrically connected to one another and a radar circuit, comprising:

providing power from a power supply to a plurality of individually-controllable groups of LEDs via a wire grid during a plurality of first time periods; and providing power from an output of at least one LED of the plurality of individually-controllable groups of LEDs to a radar circuit via said wire grid during a plurality of second time periods;

wherein said LEDs are unpowered during said second time periods; and wherein said first time periods and said second time periods are mutually exclusive; and wherein each group of LEDs is individually controllable based on radar frequency signals received at said radar circuit via an antenna input.

2. The method of claim 1, further comprising storing power provided during said first time periods, wherein said stored power is provided to said radar circuit during said second time periods.

3. A method of powering a plurality of LEDs electrically connected to one another and a radar circuit, comprising:

providing power from a power supply to a plurality of individually-controllable groups of LEDs via a wire grid during a plurality of first time periods; and providing power from said power supply to a radar circuit via said wire grid during a plurality of second time periods;

wherein said LEDs are unpowered during said second time periods; and wherein said first time periods and said second time periods are mutually exclusive; and wherein each group of LEDs is individually controllable based on radar frequency signals received at said radar circuit via an antenna, and the antenna is formed from at least one wire segment of the wire grid.

* * * * *